Oct. 15, 1940.   C. R. STASENKA   2,218,158

DANDELION PICKER

Filed June 26, 1939

Inventor
Charles R. Stasenka
By L. B. James
Attorney

Patented Oct. 15, 1940

2,218,158

UNITED STATES PATENT OFFICE 2,218,158

DANDELION PICKER

Charles R. Stasenka, Wilber, Nebr.

Application June 26, 1939, Serial No. 281,280

3 Claims. (Cl. 56—330)

This invention relates to harvesting implements and more particularly to a picker for dandelion heads, seeds and buds of plants.

The primary object of this invention resides in the provision of an implement of the above character adapted to be used by an individual in standing position so as to obviate stooping and thereby preventing back aches usually resulting where small plants are to be stripped.

Another object of this invention resides in the provision of an implement of the above character adapted to be adjusted to promote the comfort of the individual while picking the heads or seeds from small plants.

A further object of this invention resides in the provision of an implement of the above character adapted to pick or strip the heads from small plants without disturbing the surrounding growth.

With these and other objects in view, this invention resides in certain novel features of construction and arrangement of elements to be hereinafter more fully set forth in the specification, illustrated in the accompanying drawing and pointed out in the appended claims and, while this disclosure depicts my present conception of the invention, the right is reserved to resort to such changes in construction and arrangement of elements as come within the scope of the claims.

In the accompanying drawing forming a part of this application

Figure 1:
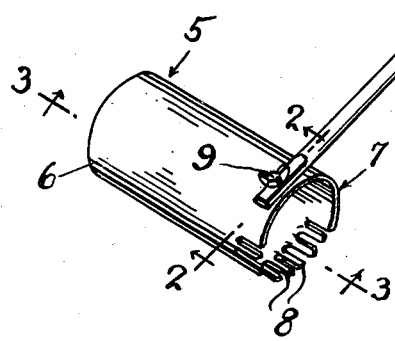
Fig. 1 is a perspective view of a picker as constructed in accordance with this invention.
Figure 2:
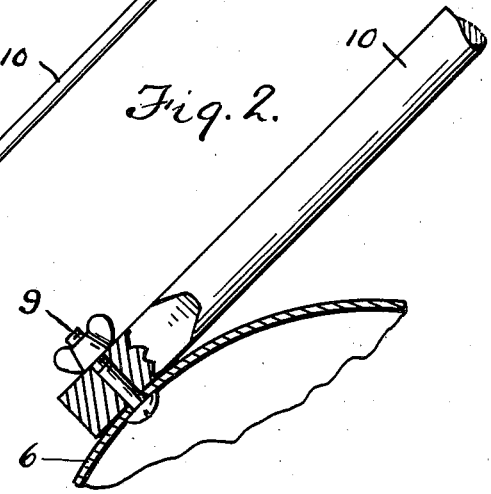
Fig. 2 is an enlarged detail sectional view approximately on line 2—2 of Fig. 1.
Figure 3:
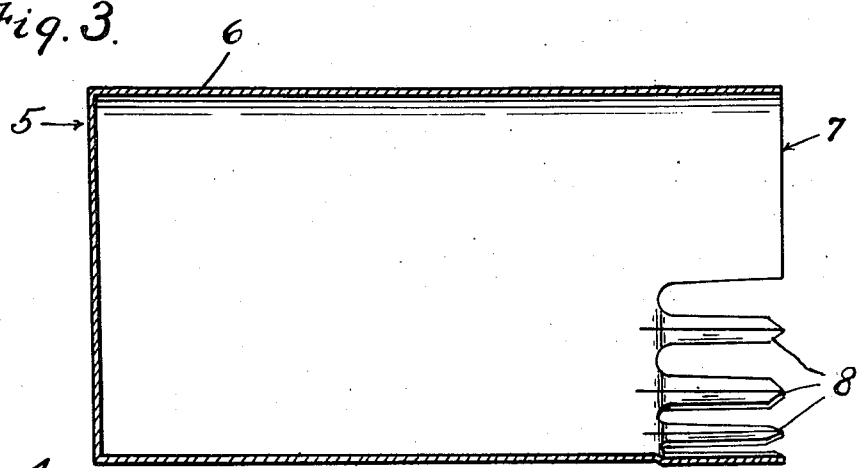
Fig. 3 is a longitudinally sectional view of the receptacle taken approximately on line 3—3 of Fig. 1.
Figure 4:
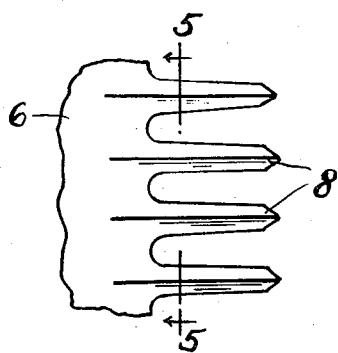
Fig. 4 is a detail plan view of the teeth.
Figure 5:
Fig. 5 is a detail sectional view of the teeth taken on line 5—5 of Fig. 4.

In the present illustration of this invention, the numeral 5 designates, in general, a picker adapted to strip the heads or seeds from small plants and preferably consists of a cylindrical receptacle 6 having a certain area of its mouth indicated at 7 provided with a series of teeth 8, said teeth preferably being substantially V-shape in cross section and tapered toward their free ends with their extremities pointed.

Adjustably secured to the receptacle preferably adjacent its mouth as by means of a suitable fastening element 9 is a handle 10 which is of such length that an individual can pick the heads or seeds from small plants without stooping.

With this invention fully described, it is manifest that a picker is provided whereby seeds and the like can be stripped from low growing plants by an individual without having to stoop and, through the simplicity of the structure involved, it can be cheaply manufactured and sold.

Having thus described my invention, what I claim and desire to protect by Letters Patent is:

1. A dandelion bud and seed picker of the character described, comprising a substantially cylindrical receptacle, a series of teeth formed in the open edge of the receptacle said teeth being V-shaped in cross section, and a handle secured to the receptacle approximately at right angles thereto and on that side thereof opposite the teeth.

2. A dandelion bud and seed picker of the character described, comprising a receptacle having one end open, a series of tapered teeth formed in the open edge of the receptacle, said teeth being V-shaped in cross section and having the apex of the V-shaped portion lying in a plane outwardly of the side of the receptacle, and an adjustable handle secured to the receptacle adjacent its open end and extending approximately at right angles to a longitudinal line passing through the center of the receptacle.

3. A dandelion bud and seed picker of the character described, comprising an elongated open receptacle having a certain area of its side serrated at its mouth, a handle normally disposed at right angles to the receptacle and means adjustably securing the handle to the receptacle adjacent its mouth.

CHARLES R. STASENKA.